United States Patent [19]
Kim

[11] Patent Number: 5,822,460
[45] Date of Patent: Oct. 13, 1998

[54] METHOD AND APPARATUS FOR GENERATING CHROMINANCE SHAPE INFORMATION OF A VIDEO OBJECT PLANE IN A VIDEO SIGNAL

[75] Inventor: Jong-Il Kim, Seoul, Rep. of Korea

[73] Assignee: Daewoo Electronics, Co., Ltd., Seoul, Rep. of Korea

[21] Appl. No.: 703,594

[22] Filed: Aug. 27, 1996

[30] Foreign Application Priority Data

May 10, 1996 [KR] Rep. of Korea .................. 96-15395

[51] Int. Cl.$^6$ ............... G06K 9/00; G06K 9/36; G06K 9/46
[52] U.S. Cl. ................. 382/243; 382/166; 382/239
[58] Field of Search .................. 382/162, 164, 382/165, 166, 242, 243, 239; 358/538, 539

[56] References Cited

U.S. PATENT DOCUMENTS

| | | | |
|---|---|---|---|
| 4,256,368 | 3/1981 | Task | 350/408 |
| 5,237,397 | 8/1993 | Mighdoll et al. | 382/232 |
| 5,287,204 | 2/1994 | Koizumi et al. | 358/538 |
| 5,585,944 | 12/1996 | Rodriguez | 382/162 |
| 5,619,591 | 4/1997 | Tsang et al. | 382/237 |
| 5,710,838 | 1/1998 | Jung | 382/242 |

*Primary Examiner*—Joseph Mancuso
*Assistant Examiner*—Timothy M. Johnson
*Attorney, Agent, or Firm*—Pennie & Edmonds LLP

[57] ABSTRACT

An apparatus generates chrominance shape information based on luminance shape information represented by binary values, to thereby describe an object in a video object plane effectively. The apparatus divides the luminance shape information into a multiplicity of sample blocks, a sample block including 2×2 pixels, and determines, for each sample block, a chrominance value based on all logic values in a sample block. The chrominance shape information is produced in a form of a matrix based on the chrominance values for all sample blocks.

8 Claims, 3 Drawing Sheets

```
X   X   X   X
  O       O
X   X   X   X

X   X   X   X
  O       O
X   X   X   X
```

```
0   0   0   0
0   1   0   0
1   1   1   1
0   1   0   0
```

# METHOD AND APPARATUS FOR GENERATING CHROMINANCE SHAPE INFORMATION OF A VIDEO OBJECT PLANE IN A VIDEO SIGNAL

FIELD OF THE INVENTION

The present invention relates to a video signal encoding method and apparatus; and, more particularly, to a method and apparatus for generating chrominance shape information of a video object plane(VOP) in a video signal.

DESCRIPTION OF THE PRIOR ART

In digital video systems such as video-telephone and teleconference systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects and three sets of parameters for defining the motion, contour and pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and area surveillance(see, for instance, MPEG-4 Video Verification Model Version 2.0, International Organisation for Standardisation, ISO/IEC JTC1/SC29/WG11 N1260, March 1996).

According to MPEG-4, an input video image is divided into a plurality of video object planes(VOP's), which correspond to entities in a bitstream that a user can access and manipulate. A VOP can be referred to as an object and represented by a bounding rectangle whose width and height may be the smallest multiples of 16 pixels(a macroblock size) surrounding each object so that the encoder processes the input video image on a VOP-by-VOP basis, i.e., an object-by-object basis.

That is, each VOP is represented by means of a bounding rectangle; and the phase difference between the luminance (Y) and chrominance(U, V) data of the bounding rectangle has to be correctly set according to a 4:2:0 format as shown in FIG. 1, wherein the luminance and the chrominance data are represented by symbols X and O respectively. Specifically, in an absolute(frame) coordinate system as depicted in FIG. 2, the top-left coordinates of a bounding rectangle 10 should be rounded first to the nearest even numbers, e.g., (2n, 2m), not greater than the top-left coordinates, e.g., (2n+1, 2m+1), of the tightest rectangle 20 surrounding an object 30, n and m being integers, respectively. The bottom-right corner of the bounding rectangle 10 is then extended so that the width and the height of the bounding rectangle are the smallest multiples of 16 pixels. Accordingly, the top-left coordinates of the bounding rectangle in the chrominance data are those of the luminance data divided by two.

A VOP disclosed in MPEG-4 includes shape information and color information consisting of luminance and chrominance data, wherein the shape information is represented by, e.g., a binary mask and related to the luminance data. In the binary mask, one binary value, e.g., 0, is used to designate a pixel located outside the object in the VOP and the other binary value, e.g., 1, is used to indicate a pixel inside the object as shown in FIG. 3. Therefore, the luminance data in the VOP is processed based on the binary mask, which can be referred to as luminance shape information, thereby selecting available luminance data to be encoded and transmitted to a transmitter.

Since, however, each one of chrominance data is associated with four of luminance data in the 4:2:0 format as shown in FIG. 1, the chrominance shape information need be generated to select available chrominance data for effectively representing the object in the VOP.

SUMMARY OF THE INVENTION

It is, therefore, a primary object of the invention to provide a method and apparatus for generating chrominance shape information capable of representing an object in a VOP effectively.

In accordance with the present invention, there is provided a method for generating chrominance shape information based on luminance shape information in the form of a matrix, wherein each element in the matrix is represented by one of two different logic values, which represent the outside and the inside of an object in a VOP, respectively, the method comprising the steps of: partitioning the luminance shape information into a multiplicity of sample blocks, each of the sample blocks containing 2×2 elements; determining a chrominance value based on all logic values in each of the sample blocks; and producing the chrominance shape information in the form of a matrix based on the chrominance values for all of the sample blocks.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figures 1, 2, 3:
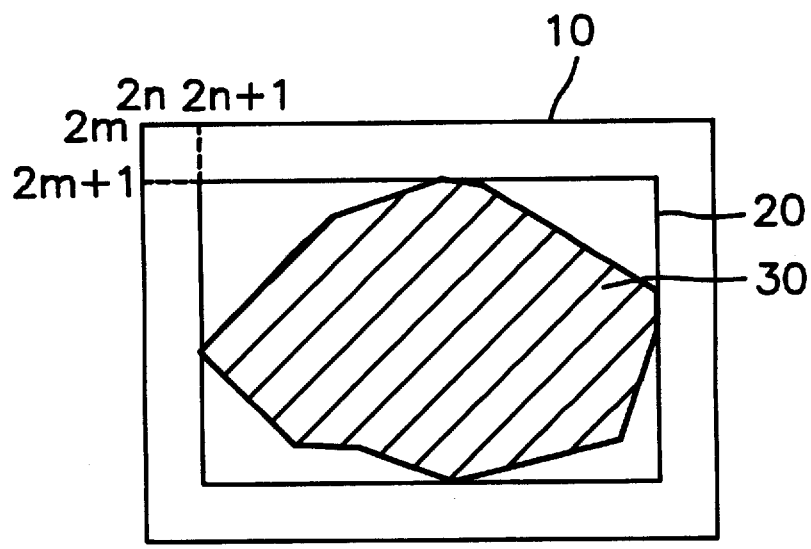
FIG. 1 describes positions of luminance and chrominance data in the 4:2:0 format.
FIG. 2 provides an illustrative diagram for showing a VOP represented by a bounding rectangle.
FIG. 3 shows luminance shape information in the form of a binary mask.
Figure 4:
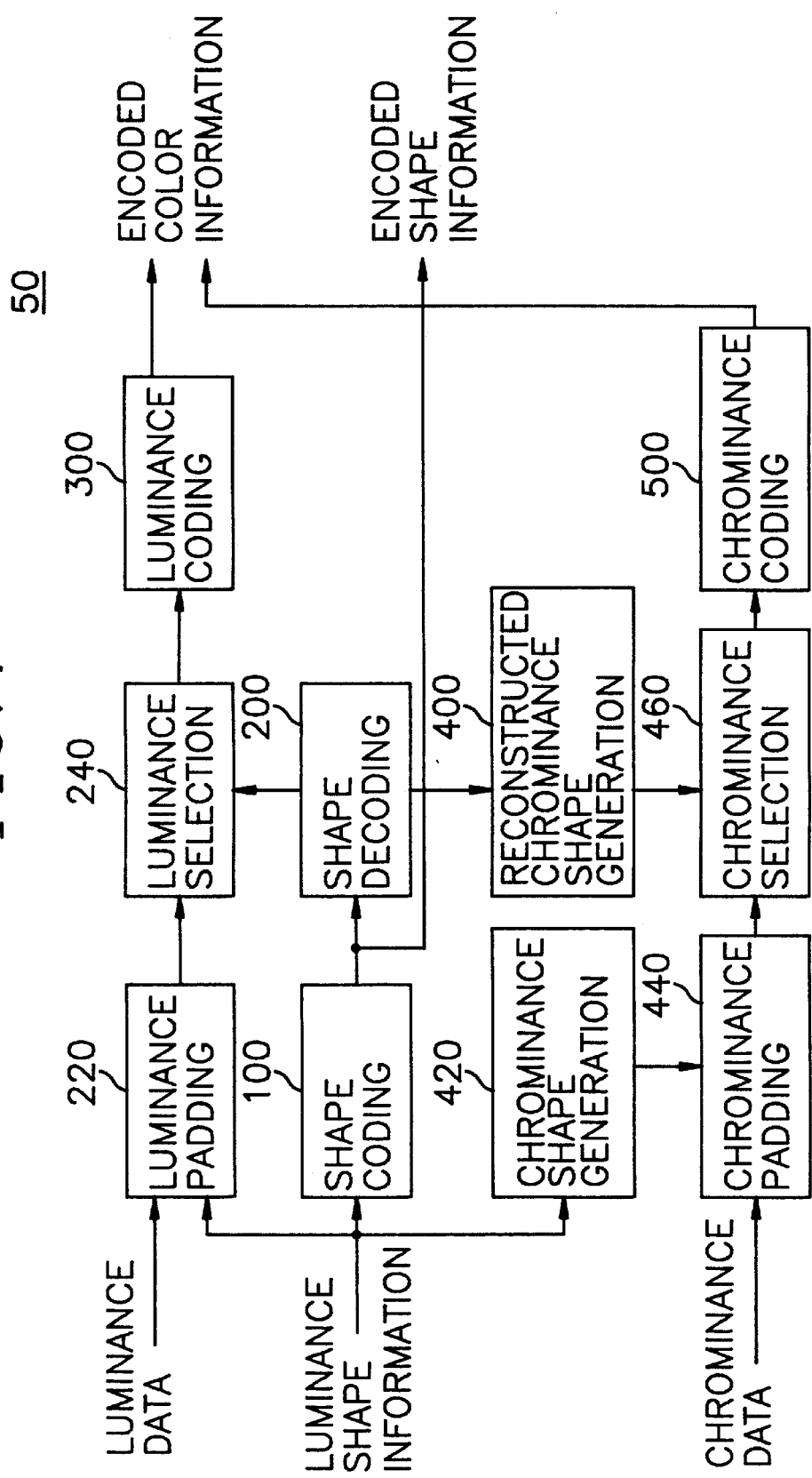
FIG. 4 presents a block diagram of an apparatus for encoding a VOP in a video signal.

Referring to FIG. 4, there is shown a block diagram of the inventive apparatus for encoding a VOP in a video signal.

VOP data including color information consisting of luminance and chrominance data and luminance shape information represented by, e.g., a binary mask is inputted to an encoder 50 as an input signal. Among the VOP data, the luminance and the chrominance data are fed to a luminance padding block 220 and a chrominance padding block 440, respectively, and the luminance shape information, which describes the distribution of available luminance data depicting an object in the VOP, is coupled to the luminance padding block 220, a chrominance shape generation block 420 and a shape coding block 100 in parallel.

The shape coding block 100 encodes the luminance shape information by using known encoding techniques, e.g., quadtree(see, for instance, MPEG-4 Video Verification Model Version 2.0, International Organisation for Standardisation, ISO/IEC JTC1/SC29/WG11 N1260, March 1996), to transmit through the transmitter(not shown) as encoded shape information, i.e., encoded luminance shape information, and also provides the encoded luminance shape information to a shape decoding block 200.

At the shape decoding block 200 in the encoder 50, the encoded luminance shape information is decoded into reconstructed luminance shape information. The reconstructed luminance shape information is coupled to a luminance selection block 240 and a reconstructed chrominance shape generation block 400.

Meanwhile, the luminance padding block 220 performs a luminance data padding process through, e.g., a repetitive padding technique based on the luminance shape information representing the shape of the object in the VOP. The padded luminance data is then transferred to the luminance selection block 240.

At the luminance selection block 240, the reconstructed luminance shape information from the shape decoding block 200 is divided into a multiplicity of subblocks, each of which includes M x N pixels, M and N being positive integers, respectively, and the number of binary value 1's in each of the subblocks is counted. If there exists at least one binary value 1 in a subblock, the padded luminance data corresponding to the subblock is selected to its encoding, and if there is no binary value 1 in a subblock, the subblock is skipped to reduce the amount of transmission data. Only the selected data in the above process is outputted to the luminance coding block 300.

The luminance coding block 300 encodes the padded luminance data from the luminance selection block 240 on a subblock-by-subblock basis, each subblock containing M×N pixels, by using a known encoding process, e.g., DCT, quantization, VLC(Variable Length Coding) or the like. The result of the encoding process, i.e., encoded luminance data, is outputted to a transmitter(not shown) for the transmission thereof.

In the meantime, the chrominance shape generation block 420 produces chrominance shape information based on the luminance shape information. The chrominance shape generation block 420, in accordance with one preferred embodiment of the present invention, first partitions the luminance shape information into a plurality of sample blocks, each of the sample blocks containing 2×2 pixels, and calculates an average of the binary values included in each sample block to determine a chrominance value for each sample block, taking either one of the binary values 1 or 0 whichever is closer to the averaged value as the chrominance value. However, if the averaged value is 0.5, binary value 1 is selected as the chrominance value. Subsequently, the chrominance shape information is obtained in a matrix form, wherein each sample block is represented by its chrominance value.

Figure 5A:
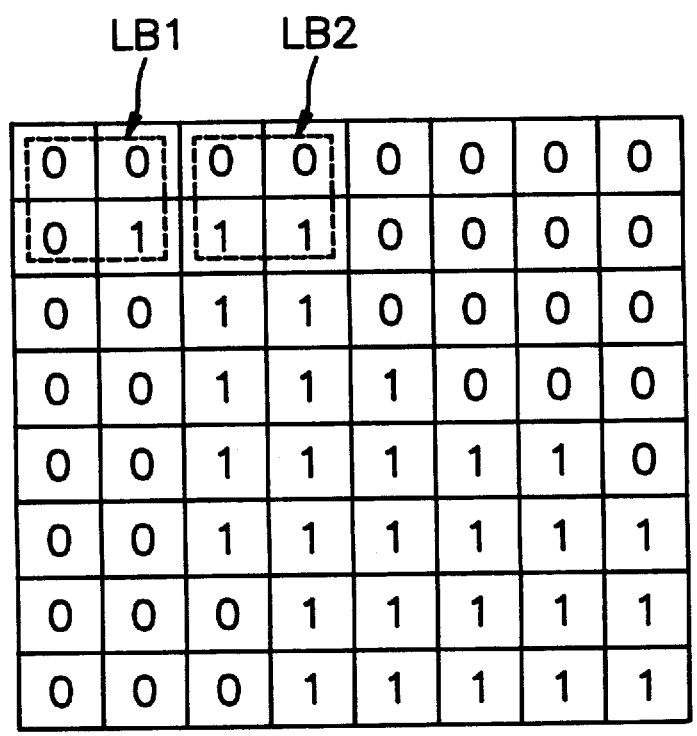
FIG. 5A offers an exemplary reconstructed luminance shape information.
Figure 5B:
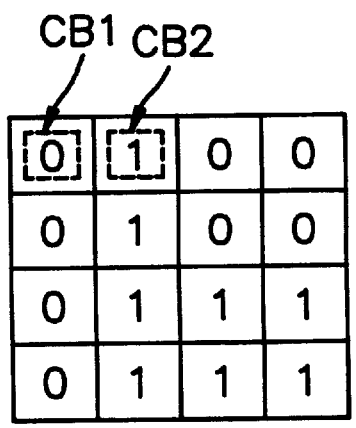
FIG. 5B represents an exemplary reconstructed chrominance shape information.

Similarly, the reconstructed chrominance shape generation block 400 produces reconstructed chrominance shape information based on the reconstructed luminance shape information from the shape decoding block 200. That is, as described in FIGS. 5A and 5B, the chrominance value for a sample block LB1 is determined to be 0 because the average of the binary values of the sample block LB1 is 0.25, which is closer to 0 than 1. On the other hand, the chrominance value of the sample block LB2 results in the binary value 1 because the average of the binary values of the sample block LB2 is 0.5. Accordingly, the subblocks CB1 and CB2 in chrominance shape information, as shown in FIG. 5B, corresponding to the sample blocks LB1 and LB2, have binary values 0 and 1, respectively.

In another preferred embodiment of the present invention, for generating the chrominance shape information, the chrominance shape generation block 420 counts the number of binary value 1's included in a sample block; selects binary value 1 as the chrominance value for the sample block if there exist not less than two binary value 1's in the sample block; and chooses binary value 0 if otherwise. The reconstructed chrominance shape generation block 400 also carries out the same process based on the reconstructed luminance shape information.

Chrominance values obtained in accordance with the above two methods are the same despite their apparent differences. Also, the processes performed at the chrominance shape generation block 420 and the reconstructed chrominance shape generation block 400 are identical to each other except for the different inputs, i.e., the luminance shape information in case of the former and the reconstructed luminance information in case of the latter, respectively.

The chrominance shape information and the reconstructed chrominance shape information generated at the chrominance shape generation block 420 and the reconstructed chrominance shape generation block 400 are fed to a chrominance padding block 440 and a chrominance selection block 460, respectively.

The chrominance padding block 440 carries out a chrominance data padding process based on the chrominance shape information produced at the chrominance shape generation block 420 in the same manner as used at the luminance padding block 220. The padded chrominance data is supplied to the chrominance selection block 460.

The chrominance selection block 460 divides the reconstructed chrominance shape information from the reconstructed chrominance shape generation block 400 into a multiplicity of subblocks, a subblock including P×Q chrominance values, P and Q being positive integers, respectively; counts the number of binary value 1's contained in each of the subblocks; and selects the padded chrominance data in the same manner as used at the luminance padding block 220 to reduce the amount of transmission data. The selected chrominance data is coupled to the chrominance coding block 500.

The chrominance coding block 500 encodes the data supplied from the chrominance selection block 460 on a subblock-by-subblock basis, each subblock containing P×Q chrominance data, through a known encoding process such as DCT, quantization, VLC, etc.

The encoded luminance and the encoded chrominance data from the luminance and the chrominance coding blocks 300 and 500, respectively, are transmitted through the transmitter(not shown) as encoded color information.

In the above, the use of the reconstructed luminance shape information in selecting the luminance and the chrominance data serves to achieve the same result as in a decoder(not shown).

While the present invention has been described with respect to certain preferred embodiments only, other modifications and variations may be made without departing from the spirit and scope of the present invention as set forth in the following claims.

What is claimed is:

1. An apparatus for encoding chrominance data based on luminance shape information in a form of a matrix, wherein each element in the matrix is represented by one of two different logic values which represent an outside and an inside of an object in a video object plane (VOP), respectively, the apparatus comprising:

means for encoding the luminance shape information;

means for decoding the encoded luminance shape information to thereby generate reconstructed luminance shape information;

means for generating chrominance shape information by using the luminance shape information;

means for producing reconstructed chrominance shape information based on the reconstructed luminance shape information;

means for masking the chrominance data in response to the chrominance shape information and padding the masked chrominance data;

means for selecting the padded chrominance data representing the inside of the object in response to the reconstructed chrominance shape information; and means for coding the selected padded chrominance data to thereby produce encoded chrominance data.

2. The apparatus as recited in claim 1, wherein the chrominance shape information generating means includes:

means for partitioning the luminance shape information into a multiplicity of sample blocks, each of the sample blocks containing K×L elements, K and L being positive integers, respectively;

means for determining a chrominance value based on all logic values in each of the sample blocks; and means for producing the chrominance shape information in the form of a matrix based on the chrominance values for all of the sample blocks.

3. The apparatus as recited in claim 2, wherein the reconstructed chrominance shape information producing means determines, based on the reconstructed luminance shape information, the reconstructed chrominance shape information in a similar manner used at the chrominance shape information generating means.

4. The apparatus as recited in claim 3, wherein the selecting means includes:

means for dividing the reconstructed chrominance shape information into a multiplicity of subblocks, each of which includes P×Q pixels, P and Q being positive integers, respectively;

means for counting logic values representing the inside of the object in each of the subblocks; and means for selecting, if there exists at least one logic value representing the inside of the object in a subblock, the padded luminance data corresponding to the subblock.

5. The apparatus as recited in claim 4, wherein the chrominance value determining means contains:

means for determining a mean value by averaging all of the logic values in each of the sample blocks; and means for selecting one of the two different logic values closer to the mean value as the chrominance value.

6. The apparatus as recited in claim 5, wherein the chrominance value, if the mean value is equal to one-half of a sum of the two different logic values, is chosen to be the logic value representing the inside of the object in the VOP.

7. The apparatus as recited in claim 4, wherein said chrominance value determining means contains:

means for counting the occurrence number of each of the logic values included in each of the sample blocks; and means for selecting one of the two logic values whose occurrence number is greater than the other as the chrominance value.

8. The apparatus as recited in claim 7, wherein the chrominance value, if the occurrence numbers of the two different logic values are identical, is chosen to be the logic value representing the inside of the object in the VOP.

* * * * *